US011171786B1

(12) United States Patent
Voit et al.

(10) Patent No.: US 11,171,786 B1
(45) Date of Patent: Nov. 9, 2021

(54) CHAINED TRUSTED PLATFORM MODULES (TPMS) AS A SECURE BUS FOR PRE-PLACEMENT OF DEVICE CAPABILITIES

(71) Applicant: Cisco Technology, Inc., San Jose, CA (US)

(72) Inventors: Eric Voit, Bethesda, MD (US); David C. Lapier, Palo Alto, CA (US); William F. Sulzen, Apex, NC (US); Pagalavan Krishnamoorthy, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 231 days.

(21) Appl. No.: 16/360,753

(22) Filed: Mar. 21, 2019

(51) Int. Cl.
*H04L 29/06* (2006.01)
*H04L 9/32* (2006.01)

(52) U.S. Cl.
CPC .................. *H04L 9/3234* (2013.01)

(58) Field of Classification Search
CPC ..................................... H04L 9/3234
USPC ....................................... 713/155
See application file for complete search history.

(56) References Cited

U.S. PATENT DOCUMENTS

| 2002/0078344 | A1* | 6/2002 | Sandhu | H04L 9/3236 713/155 |
| 2009/0210700 | A1* | 8/2009 | Nomura | G06F 21/62 713/155 |
| 2010/0083386 | A1 | 1/2010 | Kline et al. | |
| 2013/0080764 | A1* | 3/2013 | Khosravi | H04L 9/0822 713/150 |
| 2015/0379306 | A1 | 12/2015 | Zimmer et al. | |

OTHER PUBLICATIONS

Goh, "Teaching an Old TPM New Tricks: Repurposing for Identity-Based Signatures", Sep. 2013, IEEE, pp. 28-35 (Year: 2013).*
International Search Report and Written Opinion dated May 7, 2020 in Application PCT/US2020/023325 (15 pages).

* cited by examiner

*Primary Examiner* — Taghi T Arani
*Assistant Examiner* — Gregory A Lane
(74) *Attorney, Agent, or Firm* — Merchant & Gould P.C.

(57) ABSTRACT

A secure bus for pre-placement of device capabilities across a set of cryptoprocessors may be provided. A first cryptoprocessor may receive a key corresponding to a second cryptoprocessor and it may receive an object in response to the object being instantiated on the second cryptoprocessor. Next, the first cryptoprocessor may use the key to determine that the second cryptoprocessor signed the object. The first cryptoprocessor may then store the object in the first cryptoprocessor in response to determining that the second cryptoprocessor signed the object. Then the first cryptoprocessor may receive a request for the object and provide a response to the request.

20 Claims, 6 Drawing Sheets

```
Optional...

+---transient-privileges*

+---transient-privilege

+---expiry-time

+---users

|   +---user*

+---privilege-level* [number]

+---number (range 1-15)

+---command strings

+---command string*
```

FIG. 5

CHAINED TRUSTED PLATFORM MODULES (TPMS) AS A SECURE BUS FOR PRE-PLACEMENT OF DEVICE CAPABILITIES

TECHNICAL FIELD

The present disclosure relates generally to bus security.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of dynamic host configuration protocol response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings:

FIG. 5 illustrates a YANG tree showing how a temporarily allowed set of commands for one or more of users may be configured.

DETAILED DESCRIPTION

Overview

Figure 1:
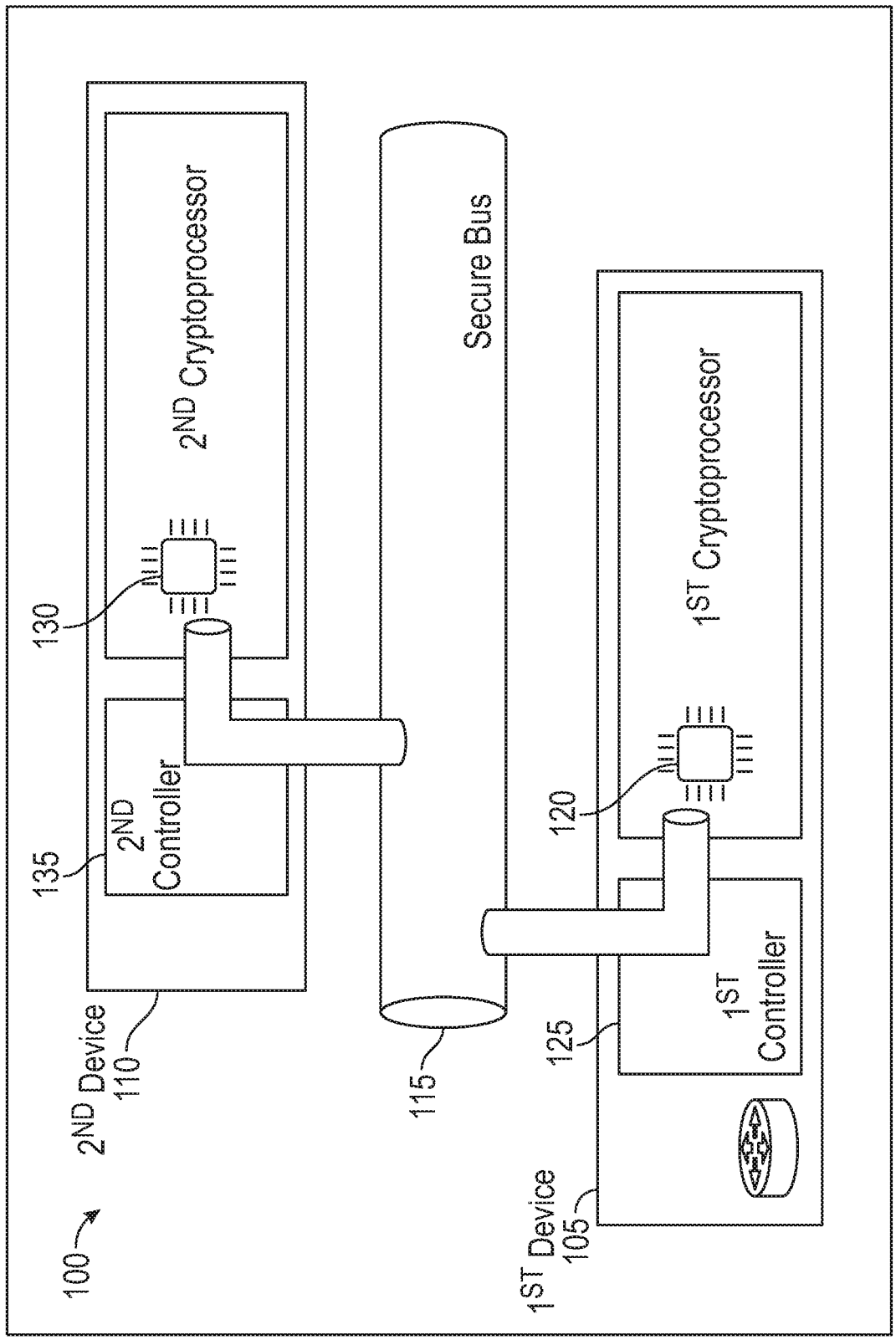
FIG. 1 is a block diagram of a system for providing a secure bus for pre-placement of device capabilities.

A secure bus for pre-placement of device capabilities across a set of cryptoprocessors may be provided. A first cryptoprocessor may receive a key corresponding to a second cryptoprocessor and it may receive an object in response to the object being instantiated on the second cryptoprocessor. Next, the first cryptoprocessor may use the key to determine that the second cryptoprocessor signed the object. The first cryptoprocessor may then store the object in the first cryptoprocessor in response to determining that the second cryptoprocessor signed the object. Then the first cryptoprocessor may receive a request for the object and provide a response to the request.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Local administrator access to a device (e.g., a switch or a router) may enable a user to read and/or modify configuration object data. However a controller or a network administrator may want to restrict access so that: i) object data may be completely hidden (even from a fully compromised device) except under certain conditions; and ii) even when visible, a local administrator of the device, may never have been given permission to modify that object data.

To support the aforementioned, for example, hardware chips may be used. Through these hardware chips, rather than exposing all object data where a local device administrative user can see it, the data may be placed so that these local device administrative users may have limited permissions. For example, these permissions may be limited/restricted so that the object data may permit no local read access except when certain preconditions are met.

As an example, consider a fingerprint scanner on a smartphone. A precondition of decrypting data on the smartphone's drive may be a successful fingerprint scan on the smartphone itself. Until the correct fingerprint input is given, even the manufacturer of the smartphone may not have visibility into device configuration or operational data.

Hiding data except under certain conditions may be a capability that may be useful for switches and routers for example. Conventional processes may be used such as hiding via manual processes like a consent token. With the consent token, it may be possible to grant an operating system (e.g., Linux) level root shell access to root users by calling a Technical Assistance Center (TAC). Such extended capabilities may be used to assist with router troubleshooting in the field. Operating system root access may not be something that is normally provided even with the highest level of router Command Line Interface (CLI) permissions on a router for example.

To support access to the capabilities exposed by a consent token, manufactures may provide a multi-factor authentication scheme to securely grant privileged access for products. This may be done by ensuring that there may be mutual assent from both a customer and the TAC for the extended access. The approval from the TAC may ensure that someone with switch/router root access may not just give themselves operating system command line access. There may be no local device hosted information visible allowing them to self-elevate their privileges.

However there may be inefficiencies with this aforementioned conventional process (i.e., the conventional consent token includes a manual process as part of the multi-factor authentication). As part of this conventional manual process, the TAC may be brought into troubleshooting a critical path. Embodiments of the disclosure may improve this. For example, embodiments of the disclosure may: i) allow a domain administrator to grant a device administrator an extended set of capabilities; ii) ensure that the device administrator may only use these extended capabilities for a limited period of time, and/or under a specific set of pre-defined conditions; and iii) preclude a local administrator from having visibility into the setting, modifying, or expiring of these extended set of capabilities.

There may be security cryptoprocessors (e.g., Trusted Platform Modules (TPMs)) that may exist on a large number of devices. Consistent with embodiments of the disclosure, it may be possible to use these cryptoprocessors to allow a domain level set of permissions to be set across a group of devices. These permissions may be provided/replicated through encrypted communications between a central controller's cryptoprocessor and a cryptoprocessor of each device. Accordingly, this may provide a secure bus for communications between the devices, where a host may have no visibility into the contents of certain information flowing between the cryptoprocessors.

Consistent with embodiments of the disclosure, for example, a Digital Network Architecture Center (DNAC) controller (i.e., a Software-Defined Network (SDN) controller) may configure information for a consent token for a specific local device user within the DNAC controller's cryptoprocessor (e.g., a TPM). The local device user information may then be be replicated across all the device cryptoprocessors within that controller's domain. This replication may be done so that encryption may exist between each of the cryptoprocessors. Accordingly, consistent with embodiments of the disclosure, provisioning policies may be performed so that local devices (e.g., routers and switches) may have no direct visibility into what has been configured. Such policies may become active when preconditions are met for example.

Embodiments of the disclosure may provision a multi-factor authenticated cryptoprocessor datastore. For example, a remote cryptoprocessor may sign updates destined for a local cryptoprocessor, and the local cryptoprocessor may be protected from local updates without the remote cryptoprocessor's approval. Because the local cryptoprocessor may also have local host approval for communications, this may result in multi-factor authentication.

A secure bus between an unbounded number of cryptoprocessors for pre-placement of device capabilities may be provided. Each of these cryptoprocessors may be individually configured with secure unique device identifiers (SUDIs) within the cryptoprocessor chips' hardware. Using these SUDIs, a secure communications may be established between intersecting sets of cryptoprocessors. Secure communications may comprise the receiving cryptoprocessor verifying that the originating cryptoprocessor originated some communications via a signature attached to that communications.

Embodiments of the disclosure may allow an application to have a relationship with one or more cryptoprocessors. Using this relationship, the application may provision a policy upon a cryptoprocessor. From this cryptoprocessor, the application policy, as well as a validating signature for the application policy signed by the cryptoprocessor, may be received by another cryptoprocessor. From there, the another cryptoprocessor may validate that the cryptoprocessor actually signed the application policy. The another cryptoprocessor may then store the application policy in response to determining that the cryptoprocessor signed the policy. From there, additional communications originating from the another cryptoprocessor may allow the application policy to be securely replicated to even more cryptoprocessors not reachable from the cryptoprocessor.

This may allow a relationship between the application and any cryptoprocessor to result in a replication of the application policy across any desired set of cryptoprocessors. This may be done with or without encryption of the policy between any two cryptoprocessors. If the communications is encrypted, the provisioning of the policy may be completely opaquely across the set of devices where the provisioning occurs.

FIG. 1 is a block diagram of a system 100 for providing a secure bus for pre-placement of device capabilities. As shown in FIG. 1, system 100 may comprise a first device 105, a second device 110, and a secure bus 115. First device 105 and second device 110 may comprise, but are not limited to, switches or routers.

First device 105 may comprise a first cryptoprocessor 120 and a first controller 125. As will be described in greater detail below, first controller 125 may include a network Operating System (OS) and Trusted Application Manager (TAM) services. Second device 110 may comprise a second cryptoprocessor 130 and a second controller 135. Second controller 135 may comprise an SDN controller under the control of an administrator and may be connect to second cryptoprocessor 130. As will be described in greater detail below, second controller 135 may include an Authentication, Authorization, and Accounting (AAA) function.

First cryptoprocessor 120 and second cryptoprocessor 130 may each comprise a secured cryptoprocessor that may comprise a dedicated computer on a chip or microprocessor for carrying out cryptographic operations, embedded in a packaging with multiple physical security measures, which give it a degree of tamper resistance. Unlike cryptographic processors that output decrypted data onto a bus in a secure environment, the secure cryptoprocessor may not output decrypted data or decrypted program instructions in an environment where security may not always be maintained. First cryptoprocessor 120 and second cryptoprocessor 130 may each comprise a TPM that may comprise a dedicated microcontroller designed to secure hardware through integrated cryptographic keys.

While embodiments of the disclosure may be described in the context of data flowing over secure bus 115 between first device 105 and second device 110, embodiments of the disclosure are not limited to data flowing over secure bus 115 implemented via interactive on-line network connectivity between those devices. For example, data may be exchanged between first device 105 and second device 110 using other processes such as using a portable memory device. The portable memory device may comprise, but is not limited to, a flash memory comprising an electronic (i.e., solid-state) non-volatile computer storage medium that may be electrically erased and reprogrammed. This example may include attaching the portable memory device to one of first device 105 and second device 110, placing data on the portable memory device, detaching the portable memory device, and reattaching portable memory device to another one of first device 105 and second device 110 where the data may be extracted. In this way, sending data over secure bus 115 may be avoided. Other processes for exchanging data between first device 105 and second device 110 may be used and embodiments of the disclosure are not limited to the portable memory device or secure bus 115.

Elements described above of system 100 (e.g., first cryptoprocessor 120, first controller 125, second cryptoprocessor 130, and second controller 135) may be practiced in hardware and/or in software (including firmware, resident software, micro-code, etc.) or in any other circuits or systems. Elements of system 100 may be practiced in electrical circuits comprising discrete electronic elements, packaged or integrated electronic chips containing logic gates, a circuit utilizing a microprocessor, or on a single chip containing electronic elements or microprocessors. Elements of system 100 may also be practiced using other technologies capable of performing logical operations such as, for example, AND, OR, and NOT, including but not limited to, mechanical, optical, fluidic, and quantum technologies. As described in greater detail below with respect to FIG. 6, elements of system 100 may be practiced in a computing device 600.

First cryptoprocessor 120 and second cryptoprocessor 130 may comprise emulated cryptoprocessors running in software. Furthermore, first cryptoprocessor 120 and second cryptoprocessor 130 may comprise distributed devices where some of their functions may run in main computer memory while certain other functions, for example, decryption, may be assisted by dedicated hardware.

Figure 2:
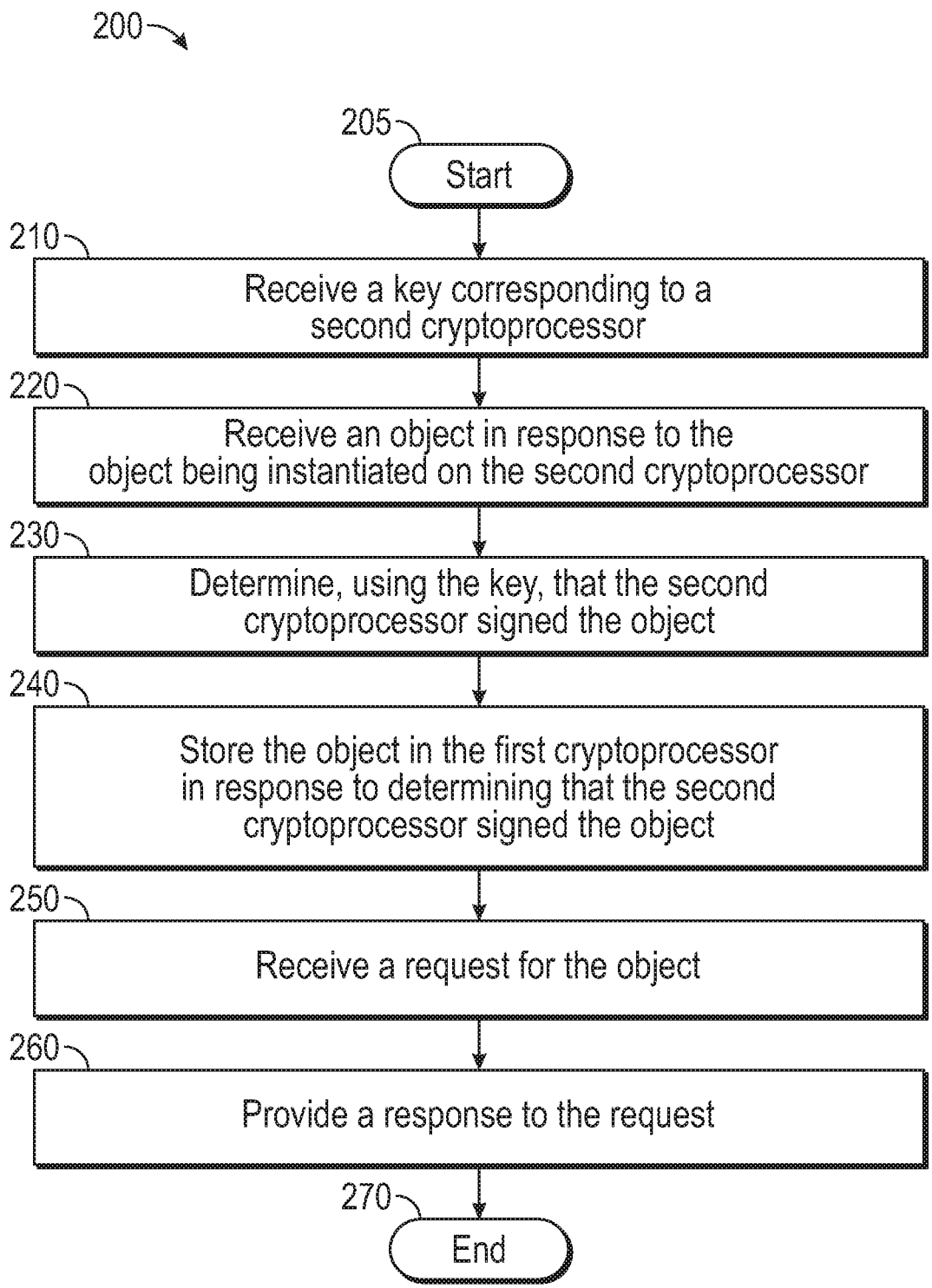
FIG. 2 is a flow chart of a method for providing a secure bus for pre-placement of device capabilities.

FIG. 2 is a flow chart setting forth the general stages involved in a method 200 consistent with an embodiment of the disclosure for providing a secure bus for pre-placement of device capabilities. Method 200 may be implemented using first cryptoprocessor 120 as described in more detail above with respect to FIG. 1. Ways to implement the stages of method 200 will be described in greater detail below.

Figure 3:
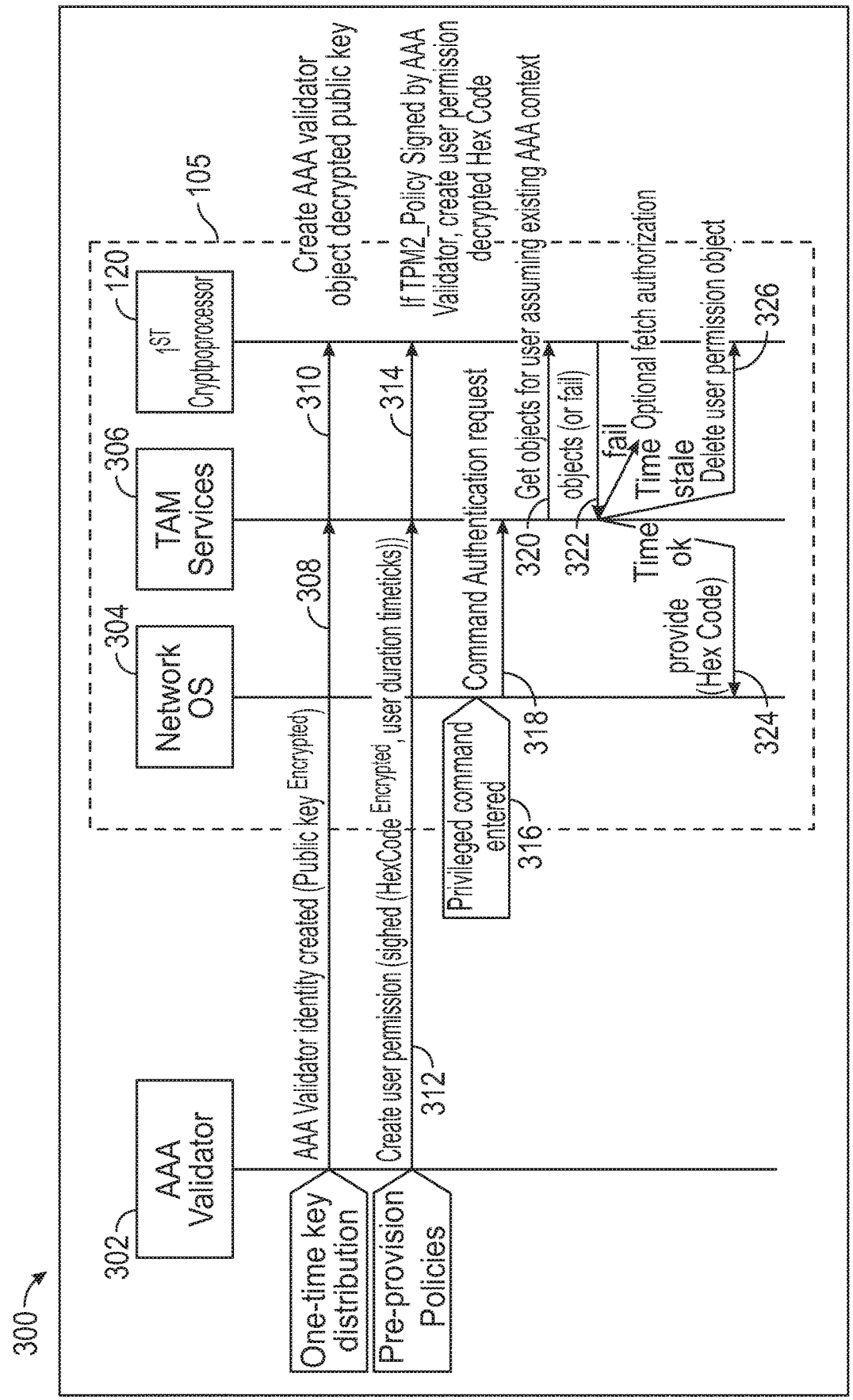
FIG. 3 is a call flow diagram of a method for providing a secure bus for pre-placement of device capabilities.

Method 200 may be described in conjunction with call flow diagram 300 of FIG. 3. As shown in FIG. 3 an Authentication, Authorization, and Accounting (AAA) validator 302 may operate in second controller 135 and a network Operating System (OS) 304 and a Trusted Application Manager (TAM) services 306 may operate in first controller 125.

Method 200 may begin at starting block 205 and proceed to stage 210 where first cryptoprocessor 120 may receive a key (e.g., a public key) corresponding to second cryptoprocessor 130. For example, AAA validator 302 may operate within an SDN controller and may distribute the key of second cryptoprocessor 130 to first cryptoprocessor 120 over secure bus 115. (Stage 308 of FIG. 3). The key may be bound to a Secure Unique Device Identifier (SUDI) of an SDN controller (i.e., second controller 135). Having the key may enable a decryption function between AAA validator 302 and first cryptoprocessor 120. TAM services 306 may receive the key and pass it on to first cryptoprocessor 120. (Stage 310 of FIG. 3). First cryptoprocessor 120 may create an AAA validator object comprising the decrypted key. While embodiments of the disclosure may be described with respect to public key/private key encryption processes, other encryption processes may be used such as symmetric key encryption for example. Embodiments of the disclosure are not limited to public key/private key encryption.

From stage 210, where first cryptoprocessor 120 receives the key corresponding to second cryptoprocessor 130, method 200 may advance to stage 220 where first cryptoprocessor 120 may receive an object. The object, for example, may comprise a policy. The object may comprise a plurality of sub-objects and commands configured to be deciphered, interpreted, stored, and acted upon by first cryptoprocessor 120 (i.e., an aggregated object). Commands may be embedded within the received object, which may be referred to as "binding".

First cryptoprocessor 120 may receive the object in response to the object being instantiated on second cryptoprocessor 130. As such, the object may be replicated between second cryptoprocessor 130 and first cryptoprocessor 120 without, for example, human knowledge or intervention. Accordingly, first cryptoprocessor 120 and second cryptoprocessor 130 may act as a distributed cluster, and the instantiation of the object on second cryptoprocessor 130 may be sufficient to start the replication onto first cryptoprocessor 120.

For example, as needed from and under the control of an administrator at the SDN controller, AAA validator 302 may push the object to first cryptoprocessor 120. The object may be encrypted by second cryptoprocessor 130 using a key (e.g., a private key) corresponding to second cryptoprocessor 130 and then sent over secure bus 115 to TAM services 306. (Stage 312 of FIG. 3). TAM services 306 may receive the encrypted object and pass it on to first cryptoprocessor 120. (Stage 314 of FIG. 3).

Once first cryptoprocessor 120 receives the object in stage 220, method 200 may continue to stage 230 where first cryptoprocessor 120 may determine, using the received key (e.g., public key), that second cryptoprocessor 130 signed the object. For example, second cryptoprocessor 130 may digitally sign the object. Second cryptoprocessor 130 may digitally sign the object using, for example, its private key. In addition, second cryptoprocessor 130 may encrypt the object using, for example, its private key.

After first cryptoprocessor 120 determines that second cryptoprocessor 130 signed the object in stage 230, method 200 may proceed to stage 240 where first cryptoprocessor 120 may store the object in first cryptoprocessor 120 in response to determining that second cryptoprocessor 130 signed the object. The stored object may be decrypted using the received key (e.g., public key). For example, after first cryptoprocessor 120 determines that second cryptoprocessor 130 signed the object, it may decrypt the object using second cryptoprocessor 130's public key. After first cryptoprocessor 120 decrypts the object, it may store the object as an object within first cryptoprocessor 120.

From there, additional communications originating from first cryptoprocessor 120 may allow the object to be securely replicated to additional cryptoprocessors (e.g., a third cryptoprocessor) that may not be reachable from second cryptoprocessor 130. In other words, a secured or trusted relationship may not already exist between second cryptoprocessor 130 and the third cryptoprocessor, or the controllers (e.g., hosts) in the middle. Accordingly, this may allow a relationship between an application and any cryptoprocessor to result in a replication of the object across any desired set of cryptoprocessors. This may be done with or without encryption of the object between any two cryptoprocessors.

From stage 240, where first cryptoprocessor 120 stores the object in first cryptoprocessor 120, method 200 may advance to stage 250 where first cryptoprocessor 120 may receive a request for the object from a user. For example, the user may comprise a network OS 304 user. The user may enter a privileged command such a request for enhanced functional access, for example, a request for operating system (e.g., Linux) root access into network OS 304. (Stage 316 of FIG. 3). When network OS 304 determines that it needs additional information to enable this enhanced or extended capability, network OS 304 may send a command authentication request to TAM services 306. (Stage 318 of FIG. 3). In response, TAM services 306 may look up in first cryptoprocessor 120 to see if the user requesting access (e.g., to first device 105) should be granted access to the requested capabilities. (Stage 320 of FIG. 3).

Once first cryptoprocessor 120 receives the request in stage 250, method 200 may continue to stage 260 where first cryptoprocessor 120 may provide a response to the request. For example, if the object stored on first cryptoprocessor 120 indicates that the user has been granted those capabilities, first cryptoprocessor 120 may provide the response to the request including unlocking information to TAM services 306 (stage 322 of FIG. 3) in the form of a hexidecimal code, for example, that may be returned to network OS 304. (Stage 324 of FIG. 3). However, if previous permissions were granted, but are now expired, TAM services 306 may send a command to erase the object from first cryptoprocessor 120 when the object is found to be expired. (Stage 326 of FIG. 3). Once first cryptoprocessor 120 provides the response to the request in stage 260, method 200 may then end at stage 270.

Consequently, embodiments of the disclosure may allow policies to be pre-provisioned in a way that may be opaque to a router's network OS (e.g., network OS 304) or embedded cryptoprocessor software Application Program Interfaces (APIs) such as TAM services (e.g., TAM services 306). Embodiments of the disclosure may allow a root-compromised router to not have all the data needed to open extended capabilities on the router.

Accordingly, embodiments of the disclosure may allow a domain administrator to pre-provision capabilities without any visibility into a device. It may do this independently of a need for external AAA validation of a command. Additionally, the domain administrator may place an expiration time on those capabilities, so that if the object has timed out, the user may have no knowledge that previous capabilities were granted. This may be because an attempt at invoking expired capabilities may result in self-erasure of those expired capabilities.

Furthermore, instead of providing a hexadecimal code, embodiments of the disclosure may provide a time-limited decryption key for exposing other hidden parts of a router's configuration. This may ensure, for example, that a hacker on a router may not be able to open a keystore without access to a cryptoprocessor held secret (i.e., this may be another process for providing multi-factor authentication). In addition, embodiments of the disclosure may provide a temporary license for router capabilities/features that may be granted in a way that may automatically expire. There may be no limitations on the types of object(s) that may be stored and accessed.

Moreover, a device (e.g., a router) may be rendered inoperable of forwarding (e.g., except for local diagnostic and management connectivity) unless a heartbeat object is provided/configured from an AAA validator or some other Network management System (NMS). If a device was stolen, a way to re-enable operation (e.g., even after a factory reset of the device) may be connectivity to the cryptoprocessor and keys provided from a manufacturer. Embodiments of the disclosure may also retain extended permissions even across boot cycles (e.g., by storing object data in Non Volatile (NV) memory). Embodiments of the disclosure may also support rolling identity data for use within an Extensible Authentication Protocol (EAP) to network peers. This may allow peers to know if certain conditions on a local device have been met.

Figure 4:
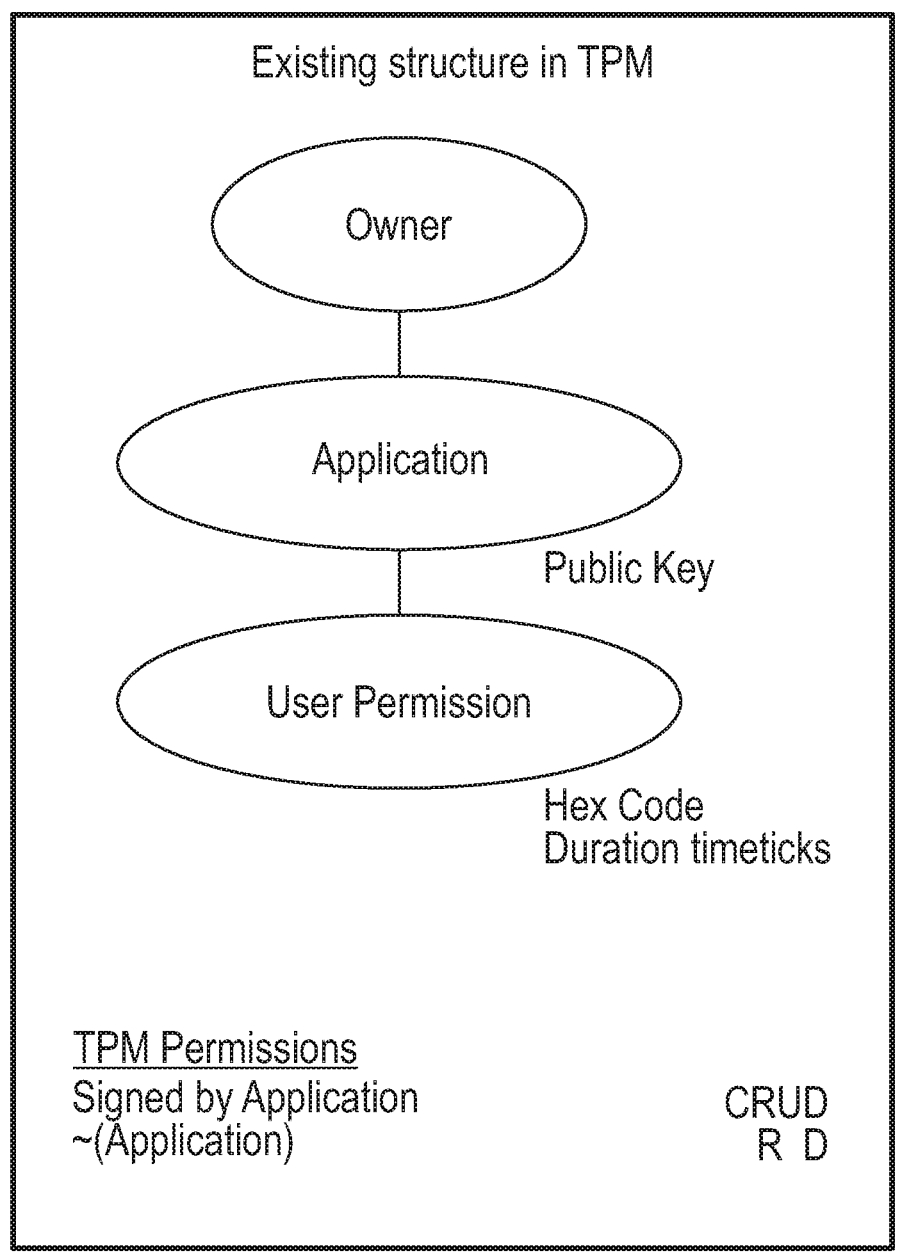
FIG. 4 illustrates a secure bus for pre-placement of device capabilities process.

As illustrated by FIG. 4, embodiments of the disclosure may provide a cryptoprocessor that may allow a limited set of local objects to be created within it. As shown in FIG. 4, an AAA validator may be added as an object on a crypto-processor. If a user permission is added later that may be properly signed by the AAA validator, it may be placed as a child object of the AAA validator on the cryptoprocessor. The result may comprise an opaque provisioning of a user object specific to the AAA validator domain. The information needed for a consent token (e.g., a hexadecimal code and length of time for it to be active) may then be provisioned. As a result, embodiments of the disclosure may provide a multi-factor authentication for the user, for example, because enabled super-user policies may have been pushed via an alternative provisioning path down to a device. Thus a multi-factor process may be provided without requiring additional visibility on the part of the user.

Beyond consent token and operating system (e.g., Linux) access, embodiments of the disclosure may provide extended capabilities that may be provisioned within a cryptoprocessor. FIG. 5 illustrates a YANG tree showing how a temporarily allowed set of commands for one or more users may be configured. AAA authorized commands may also be able to accomplish a similar function rather than a cryptoprocessor, however: i) this process may require an AAA query to be made for each entered command (e.g., rather than the pre-provisioned authorization process above); ii) it may require the AAA command server to be on-line, and able to serve potentially many requests; and iii) the AAA server may not be able to validate that a router/switch currently is in a state where specific device preconditions have been met.

Consistent with embodiments of the disclosure, a set of user policies may be configured from a controller to a secure cryptoprocessor on a router/switch. These policies may be invisible to even a root compromised router/switch except under predetermined local conditions. This may enable a network administrator to grant specific capabilities to a specific local device administrator via a form of multi-factor authentication. This may provide a time-limited consent token granting extended capability, such as a Linux shell access, to a local administrator on a switch/router without requiring additional input from a local user.

Figure 6:
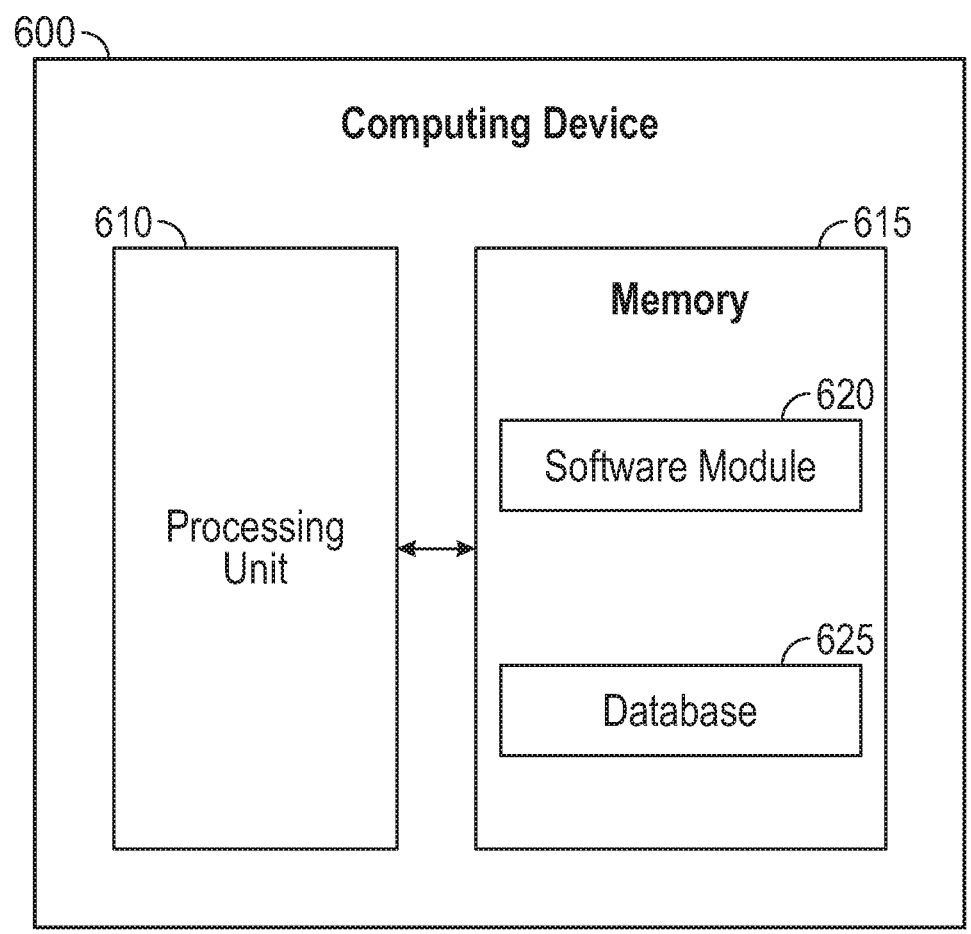
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing a secure bus for pre-placement of device capabilities, including for example, any one or more of the stages from method 400 described above with respect to FIG. 4. Computing device 600, for example, may provide an operating environment for first cryptoprocessor 120, first controller 125, second cryptoprocessor 130, and second controller 135. First cryptoprocessor 120, first controller 125, second cryptoprocessor 130, and second controller 135 may operate in other environments and is not limited to computing device 600.

Computing device 600 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, by a first cryptoprocessor, a key corresponding to a second cryptoprocessor;
receiving, by the first cryptoprocessor located on a first device, an object comprising a policy to be stored in response to the object being instantiated on the second cryptoprocessor located a second device, wherein the object is replicated on the first cryptoprocessor in response to the object being instantiated on the second cryptoprocessor, wherein the object is encrypted by the second cryptoprocessor using the key, and wherein the key is bound to a secure unique device identifier of a software defined network controller associated with the second cryptoprocessor;
determining, by the first cryptoprocessor using the key, that the second cryptoprocessor signed the object;
storing, by the first cryptoprocessor, the object in the first cryptoprocessor in response to determining that the second cryptoprocessor signed the object;
receiving, by the first cryptoprocessor, a request for the object from a user; and
providing, by the first cryptoprocessor, a response to the request.

2. The method of claim 1, wherein receiving the object comprise receiving the object comprising a plurality of sub-objects configured to be interpreted by the first cryptoprocessor.

3. The method of claim 1, wherein receiving the object comprise receiving the object comprising a plurality of sub-objects and commands configured to be deciphered, interpreted, stored, and acted upon by the first cryptoprocessor.

4. The method of claim 1, wherein receiving the request comprises receiving the request for a user to receive enhanced functional access and wherein providing the response comprises:
- determining from the object that the user has permission; and
- providing unlocking information in response to determining from the object that the user has permission.

5. The method of claim 4, wherein providing the unlocking information comprise providing a time-limited decryption key for exposing hidden parts of a router configuration.

6. The method of claim 4, wherein providing the unlocking information comprises providing a temporary license for router capabilities and features that expires after a predetermined period of time.

7. The method of claim 4, wherein providing the response comprises:
- determining from the object that the user has permission;
- determining that the object has expired; and
- erasing the object in response to determining from the object that the user has permission and determining that the object has expired.

8. The method of claim 1, further comprising replicating, by the first cryptoprocessor, the object to a third cryptoprocessor that does not have a trusted relationship with not reachable the second cryptoprocessor.

9. The method of claim 1, further comprising replicating, by the first cryptoprocessor, the object to a third cryptoprocessor wherein a host associated with the third cryptoprocessor does not have a trusted relationship with a host associated with the second cryptoprocessor.

10. The method of claim 1, wherein receiving the key corresponding to the second cryptoprocessor comprises receiving the key via a portable memory device.

11. The method of claim 1, wherein receiving the object comprises receiving the object via a portable memory device.

12. The method of claim 1, wherein receiving, by the first cryptoprocessor, comprise receiving by the first cryptoprocessor wherein the first cryptoprocessor comprises an emulated cryptoprocessor running in software.

13. The method of claim 1, wherein receiving, by the first cryptoprocessor, comprise receiving by the first cryptoprocessor wherein the first cryptoprocessor comprise a distributed device including dedicated hardware configured to run decryption functions.

14. A system comprising:
- a memory storage; and
- a processing unit disclosed in a first cryptoprocessor and coupled to the memory storage, wherein the processing unit is operative to:
  - receive a key corresponding to a second cryptoprocessor;
  - receive an object comprising a policy to be stored in response to the object being instantiated on the second cryptoprocessor located on another system, wherein the object is replicated on the first cryptoprocessor in response to being instantiated on the second cryptoprocessor, wherein the object is encrypted by the second cryptoprocessor using the key, and wherein the key is bound to a secure unique device identifier of a software defined network controller associated with the second cryptoprocessor;
  - determine, using the key, that the second cryptoprocessor signed the object;
  - store the object in the memory storage in response to determining that the second cryptoprocessor signed the object;
  - receive a request for the object; and
  - provide a response to the request.

15. The system of claim 14, wherein the processing unit being operative to provide the response comprises the processing unit being operative to:
- determine from the object that a user has permission; and
- provide unlocking information in response to determining from the object that the user has permission.

16. The system of claim 15, wherein the processing unit being operative to provide the unlocking information comprises the processing unit being operative to provide a temporary license for router capabilities and features that expires after a predetermined period of time.

17. The system of claim 14, wherein the processing unit being operative to provide the response comprises the processing unit being operative to:
- determine from the object that a user has permission;
- determine that the object has expired; and
- erase the object in response to determining from the object that the user has permission and determining that the object has expired.

18. A non-transitory computer-readable medium that stores a set of instructions which when executed perform a method comprising:
- receiving, by a first cryptoprocessor, a key corresponding to a second cryptoprocessor;
- receiving, by the first cryptoprocessor located on a first device, an object comprising a policy to be stored in response to the object being instantiated on the second cryptoprocessor located on a second device, wherein the object is replicated on the first cryptoprocessor in response to being instantiated on the second cryptoprocessor, wherein the object is encrypted by the second cryptoprocessor using the key, and wherein the key is bound to a secure unique device identifier of a software defined network controller associated with the second cryptoprocessor;
- determining, by the first cryptoprocessor using the key, that the second cryptoprocessor signed the object;
- storing, by the first cryptoprocessor, the object in the first cryptoprocessor in response to determining that the second cryptoprocessor signed the object;
- receiving, by the first cryptoprocessor, a request for the object; and
- providing, by the first cryptoprocessor, a response to the request.

19. The non-transitory computer-readable medium of claim 18, wherein providing the response comprises:
- determining from the object that a user has permission; and
- providing unlocking information in response to determining from the object that the user has permission.

20. The non-transitory computer-readable medium of claim 18, wherein providing the response comprises:
- determining from the object that a user has permission;
- determining that the object has expired; and
- erasing the object in response to determining from the object that the user has permission and determining that the object has expired.

* * * * *